(12) United States Patent
Thyagaturu et al.

(10) Patent No.: US 11,956,156 B2
(45) Date of Patent: Apr. 9, 2024

(54) DYNAMIC OFFLINE END-TO-END PACKET PROCESSING BASED ON TRAFFIC CLASS

(71) Applicant: Intel Corporation, Santa Clara, CA (US)

(72) Inventors: Akhilesh S. Thyagaturu, Ruskin, FL (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 694 days.

(21) Appl. No.: 17/016,555

(22) Filed: Sep. 10, 2020

(65) Prior Publication Data

US 2020/0412655 A1    Dec. 31, 2020

(51) Int. Cl.
*H04L 47/2441* (2022.01)
*H04L 9/40* (2022.01)
*H04L 43/028* (2022.01)
*H04L 49/90* (2022.01)

(52) U.S. Cl.
CPC ........ *H04L 47/2441* (2013.01); *H04L 43/028* (2013.01); *H04L 49/9084* (2013.01); *H04L 63/0245* (2013.01)

(58) Field of Classification Search
None
See application file for complete search history.

(56) References Cited

U.S. PATENT DOCUMENTS 11,481,350 B1 * 10/2022 Gangam ............. G06F 13/4282
11,824,764 B1 * 11/2023 Matthews ............. H04L 45/245

2007/0263783 A1 * 11/2007 Speranza .......... H04M 3/42221
    379/67.1
2008/0168066 A1    7/2008 Ruiz-Velasco et al.
2008/0189335 A1    8/2008 Sikchi et al.
2010/0312909 A1 * 12/2010 Diab ..................... G06F 1/3209
    713/320

(Continued)

FOREIGN PATENT DOCUMENTS

WO    2019139595 A1    7/2019

OTHER PUBLICATIONS

International Search Report and Written Opinion for PCT Patent Application No. PCT/US21/43669, dated Nov. 5, 2021, 11 pages.

*Primary Examiner* — Mariela Vidal Carpio
(74) *Attorney, Agent, or Firm* — Compass IP Law PC

(57) ABSTRACT

Methods and apparatus for dynamic offline end-to-end packet processing based on traffic class. An end-to-end connection is set up between an application on a client including a processor and host memory and an application on a remote server. An offline packet buffer is allocated in host memory. While the processor and/or a core on with the client application is executed is in a sleep state, the client is operated in an interrupt-less and polling-less mode as applied to a predetermined traffic class. Under the mode, a Network Interface Controller (NIC) at the client receives network traffic from the remote server and determines whether the network traffic is associated with the predetermined traffic class. When it is, the NIC writes packet data extracted from the network traffic to an offline packet buffer. Descriptors are generated and provided to the NIC to inform the NIC of the location and size of the offline packet buffer.

20 Claims, 9 Drawing Sheets

(56) References Cited

U.S. PATENT DOCUMENTS

| | | | |
|---|---|---|---|
| 2013/0297887 A1* | 11/2013 | Woodward | G06F 16/183 |
| | | | 711/137 |
| 2016/0170919 A1* | 6/2016 | Blagodurov | G06F 11/3452 |
| | | | 711/154 |
| 2016/0379109 A1* | 12/2016 | Chung | G06N 3/063 |
| | | | 706/26 |
| 2017/0091108 A1* | 3/2017 | Arellano | G06F 13/4282 |
| 2020/0183732 A1 | 6/2020 | Cornett et al. | |
| 2020/0412655 A1 | 12/2020 | Thyagaturu et al. | |
| 2021/0126854 A1* | 4/2021 | Guo | H04L 41/145 |

* cited by examiner

Descriptor Structure:
Sent by Application to NIC

Completion Status Structure:
Written by NIC to System Memory

DYNAMIC OFFLINE END-TO-END PACKET PROCESSING BASED ON TRAFFIC CLASS

BACKGROUND INFORMATION

In traditional systems, packet processing happens in two ways: 1) polling mode such as Data Plane Development Kit (DPDK) Poll Mode Driver (PMD), and 2) interrupt mode. Most widely adopted strategies focus on improving the network throughput of the system via: batching of packets by the NIC during each batch-period before notifying the poller, as well as deferring the interrupt generation for batch-period by the Network Interface Controller or Card (NIC), such as used by Linux's New API (NAPI). New API is a kernel interrupt moderation technique where the NAPI driver disables interrupts with the NIC after the first instance for a given batch of packets, switches to polling mode for processing the batch of packets as well as the new packet arrival until an idle time-out where the in interrupt is reenabled.

The basic trade-offs between state-of-art based interrupts and polling methods are:
1. Polling wastes CPU (Central Processing Unit) cycle resources when there are no packets arriving at the NIC, but when the packet arrives, the CPU is ready to process almost instantaneously. This method is well suited for low latency and high throughput. However, polling by the application/network-driver is agnostic to traffic class, as the driver has no context of what type of traffic and whose traffic is arriving at the NIC over the link (in the upstream direction).
2. Interrupts create overhead at the CPU with context switches, thereby reducing the overall efficiency of system, especially for high throughput scenarios. Although, there exist packet steering and flow steering strategies such as Receive Side Scaling (RSS) at the NIC, interrupt generation in heavy network traffic results in significant overhead.

CPU Core transitions to low power states is a critical component to reduce power consumption of systems. In case of data centers, as the number and connectivity of servers increase, so does the overall traffic, as well as the traffic classes and flow requirements. Recent connectivity advances such as 5G brings out diverse application use cases such as remote healthcare, virtual reality and storage-less compute, driving larger data rates. Handling these and other types of traffic under current polling and interrupt approaches results in increased power consumption.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
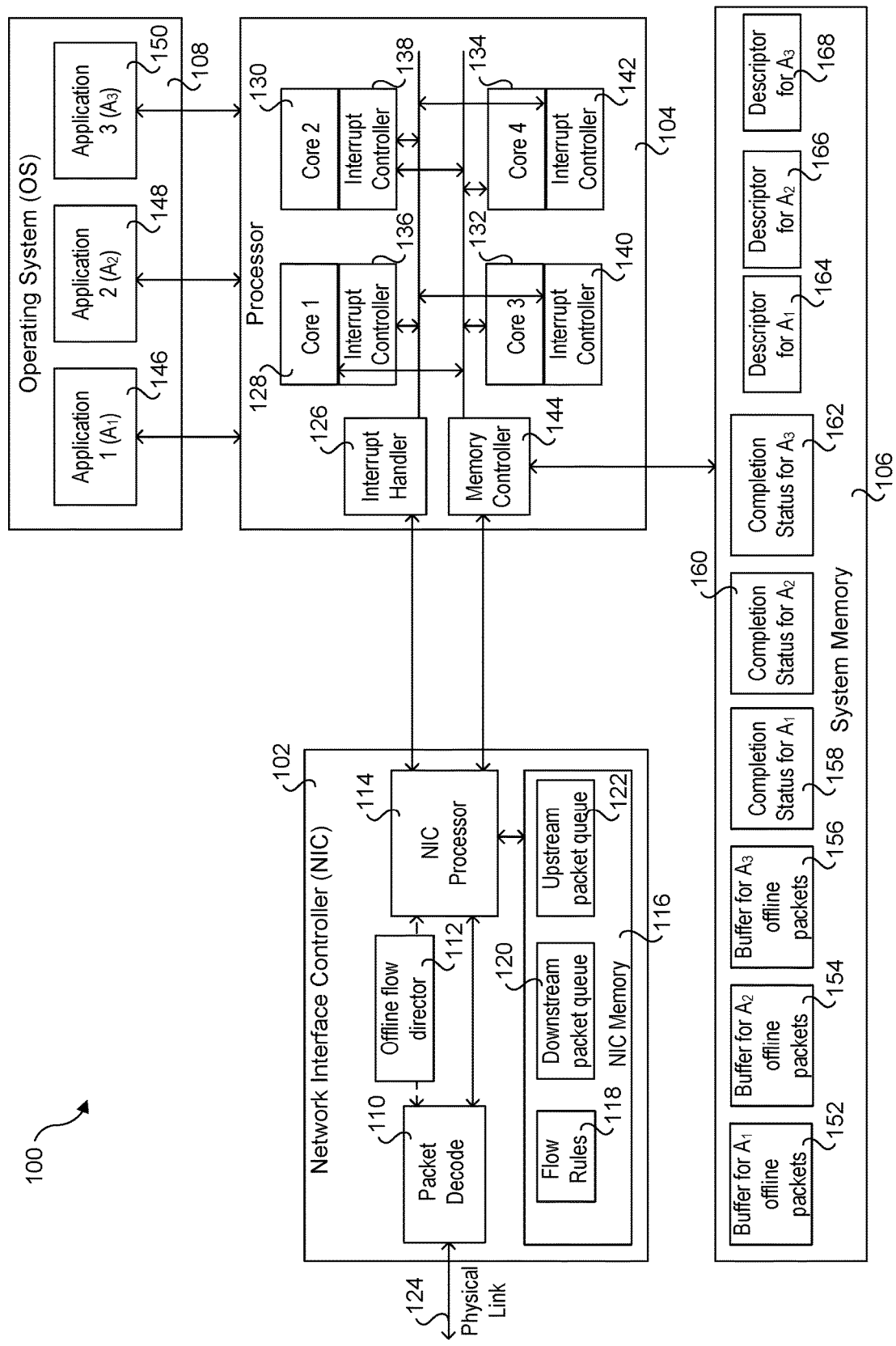
FIG. 1 is a schematic diagram of a system architecture illustrating an enhanced NIC including an offline flow director to write application data to system memory, according to one embodiment.

Embodiments of methods and apparatus for dynamic offline end-to-end packet processing based on traffic class are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Under aspect of the embodiments described herein, a framework is provided that operates in an interrupt-less fashion where an application passively checks for data in a pre-defined buffer, as opposed to always being reactive through interrupts, or pro-active through polling (also referred to a "busy" polling). This approach mitigates the interrupt arrivals when a CPU is asleep, and opportunistically saves power due to extra sleep gained by the CPU. Example application include data backup, usage tracking, regular updates, non-traditional version updates, and software such as Microsoft, Adobe, and Java maintenance traffic.

Embodiments provide a technique for a CPU to inform a NIC with a "Do-Not-Disturb" sign while asking the NIC to write the packets at a specified memory location, for a specific kind (e.g., 5-tuple socket information) of traffic such that the CPU (i.e., software of interest) can process the packets "offline" when needed. Novel aspects of this approach include:

1. Techniques for an application to access and process offline packets, in asynchronous and non-periodic fashion with a goal of maximizing CPU and/or processor core sleep time. This requires no interrupts, and no separate polling threads, but is rather done in the application thread context, in one embodiment.
2. The definitions of "offline-flow," protocol and interfaces for an end-to-end connection and supporting flow control with exchange of buffer state for data-transfer between end nodes.

In one aspect, the general idea is for an application to provide a buffer or set of buffers in its address space, map them to tuples, and configure the NIC to divert the packets to these buffers using a Process Address Space Identifier (PASID). This mechanism can be local or exposed via network interfaces to other nodes on the network for better efficiency.

In a complex application, many threads may be running and the number of threads of an application may dynamically vary. When the number of threads reduce, processor cores free up and can go into idle/P-states, although an application itself is not sleeping. In one aspect, an application may decide to use offline flows to prudently save the power of the system based on information such as number of threads running and data kind (time-sensitive or not).

In one embodiment, an application configures a NIC with a set of buffers for every latency-tolerant flow it wants to offline, and its associated PASID. This enables the application threads to consume the data packets directly from user-space. There are no polling threads in the offline flow processing; rather, the application checks and consumes offline buffer data at convenient times (asynchronously) in its own thread context, not based on a fixed timer or interrupts.

As used herein, "offline" does not mean the NIC is disconnected from the network or network(s), but rather means the application(s) for which offline packet processing is performed is/are not active during timeframes under which offline packet processing is performed. For example, execution threads associated with the applications may be assigned to a processor core or cores that may transition between active and sleep states; when in a sleep state the execution threads are not executed, and thus the application is temporarily "offline."

FIG. 1 shows a system architecture 100 illustrating the Network Interface Controller enhancement with offline flow director to write application data to system memory. The System memory consists of buffers valid for data capture, completion status, and descriptors corresponding to each application, according to one embodiment.

The high-level blocks in system architecture 100 include a NIC 102, a processor 104, system memory 106, and an operator system 108. NIC 102 includes a packet decode block 110, an offline flow director block 112, a NIC processor 114, and NIC memory 116 containing flow rules 118, a downstream packet queue 120, and an upstream packet queue 122. To realize an offline processing of packets through an interrupt-less and polling-less mechanism, NIC 102 is enhanced with logic (offline flow director block 112) to track 5-tuple socket information, and user application PASID to match the incoming traffic and dereference the pointers to appropriate memory regions allocated by the application.

Packet decode block 110 is depicted as being connected to a physical link 124 that would be connected to a network (not shown). For simplicity, aspects of NIC 102 relating to a Physical (PHY) Layer and a Media Access Control (MAC) Layer processing are not shown. As will be recognized by those skilled in the art, data received from a network via physical link 124 would undergo PHY and MAC Layer processing and be buffered in a port buffer (not shown) or in upstream packet queue 122 prior to being processed by packet decode block 110.

Processor 104 includes a plurality of processor cores 128, 130, 132, and 134 of which four are shown: Core 1, Core 2, Core 3, and Core 4. Generally, a processor may include N cores, where N is an integer such as but not limited to 4, 6, 8, 10, 12, 16, 20, 24, 28, 32, etc. Cores 128, 130, 132, and 134 have respective interrupt controllers 136, 138, 140, and 142. Processor 102 further includes an interrupt handler 126 and a memory controller 144 that provides access to system memory 106.

Figure 6:
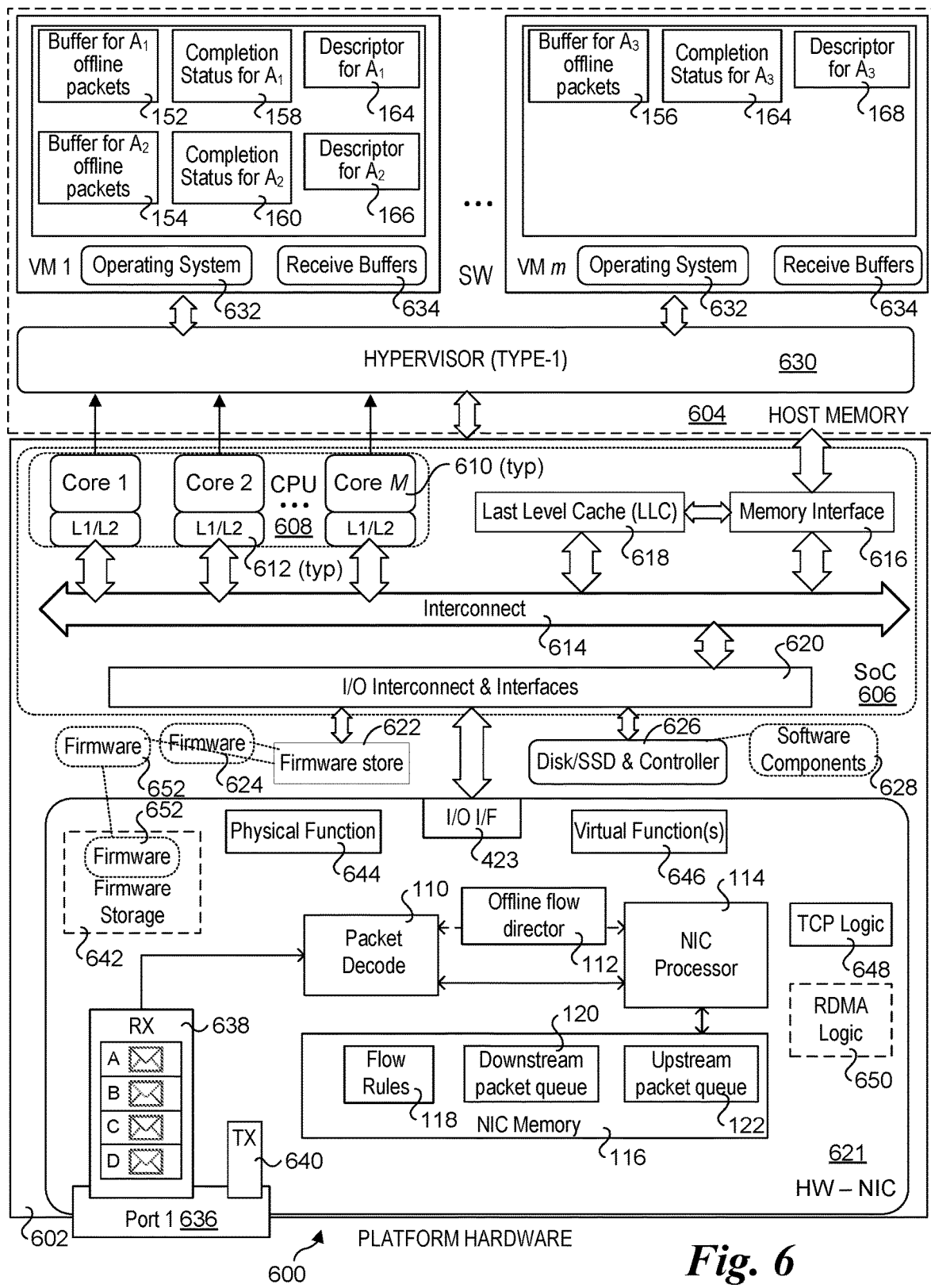
FIG. 6 is a schematic diagram of a platform architecture configured to host a plurality of virtual machines in which applications and associated offline packet buffers, completion statuses and descriptors are implemented, and a NIC configured to implement the hardware device operations of FIGS. 1, 2a and 2b, according to one embodiment.
Figure 6A:
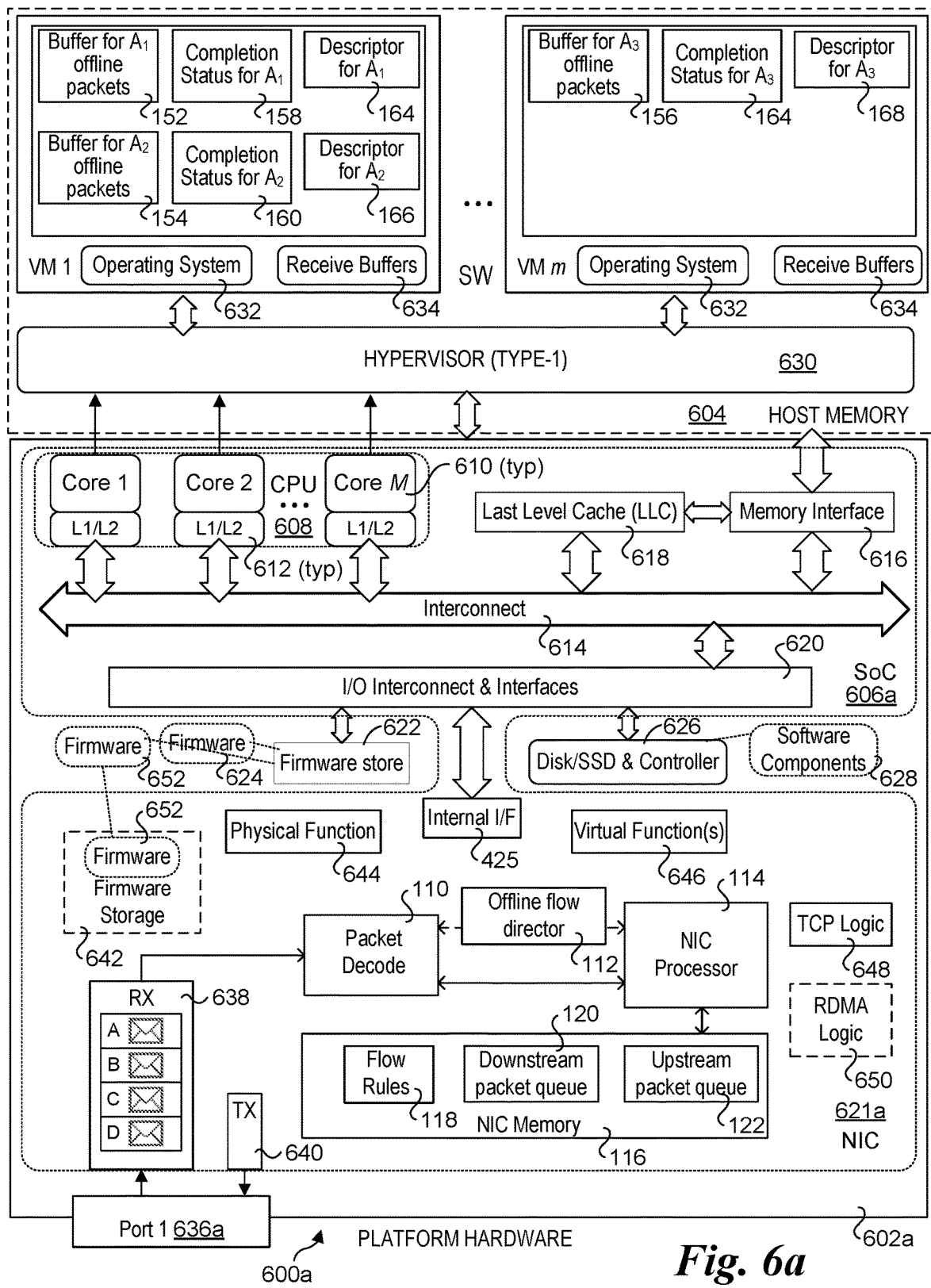
FIG. 6a is a schematic diagram of a platform architecture similar to that shown in FIG. 6 in which the NIC is integrated in the SoC.

Operating system 108 is deployed in system memory 106 and is used to host multiple applications, as depicted by applications 146, 148, and 150 (also respectively depicted as applications $A_1$, $A_2$, and A3). Generally, the applications may run on an operating system that is running on processor 104 or operating system 108 may be representative of an operating system running in a virtual machine or container hosted by processor 104. Moreover, for platforms employing virtualization there may be multiple instances of operating systems, with each OS instance hosting one or more applications. Examples of platforms employing virtualization illustrating further details of how applications may be run are shown in FIGS. 6 and 6a below.

System memory 106 is used to store data and software, which includes operating system 108 and applications $A_1$, $A_2$, and $A_3$. In addition, as shown in the lower portion of FIG. 1, system memory 106 include a buffer for application $A_1$ offline packets 152, a buffer for application $A_2$ offline packets 154, a buffer for application $A_3$ offline packets 156, a completion status queue for application $A_1$ 158, a completion status queue for application $A_2$ 160, a completion status queue for application $A_3$ 162, a descriptor queue for application $A_1$ 164, a descriptor queue for application $A_2$ 166, and a descriptor queue for application $A_3$ 168. Generally, a system or platform may run M applications (where M is an integer that may vary over time), and there would be a respective buffer for offline packets, a respective completion status queue, and a respective descriptor queue for each of the M applications for which offline processing of packets are set up.

Generalized implementation of offline processing of packets can be briefly summarized as follows:

1 An application requests an end-to-end connection with a remote server for data transfer between a client (on the local platform/server) and the remote server.

2 With the connection setup from the remote server, the application extracts 5-tuple data from packet headers including the source IP, destination IP, source port, destination port, and IP type, e.g., TCP for stateful and UDP for stateless.

3 The application creates a descriptor with details of the 5-tuple data, a completion status structure, allocated buffer details for data copy, and a PASID to dereference application pointers by the NIC.

4 The application submits the descriptor filled with information on the 5-tuple data, completion status structure, allocated buffer details for data copy to NIC, and confirms the setup complete.

5 The application asynchronously checks back the data buffer location on the system memory, consume the data, move the data to storage, make space available for future packets, and update the completion record with new updated buffer information to the NIC. The NIC updates the pointer and length information relevant for data push onto buffer location.

6 For end-to-end flow control, the remote-server can be notified with the feature, and buffer status can be constantly fed-back to the remote server connection such that the application knows how much data can be pushed.

7 If no flow-control mechanism in place, the NIC can drop packets (if applicable), and the network application layer can run an appropriate recovery routine.

8 During the entire process, cores would enter and leave sleep states based on other events which are orthogonal to the NIC events related to delay-tolerant traffic, thus protecting the cores from unnecessary wakeups and thereby saving power opportunistically.

9 The application requests for the tear-down of the offline capture, and deallocates the buffer, completion status, and descriptor on the memory.

Figure 2A:
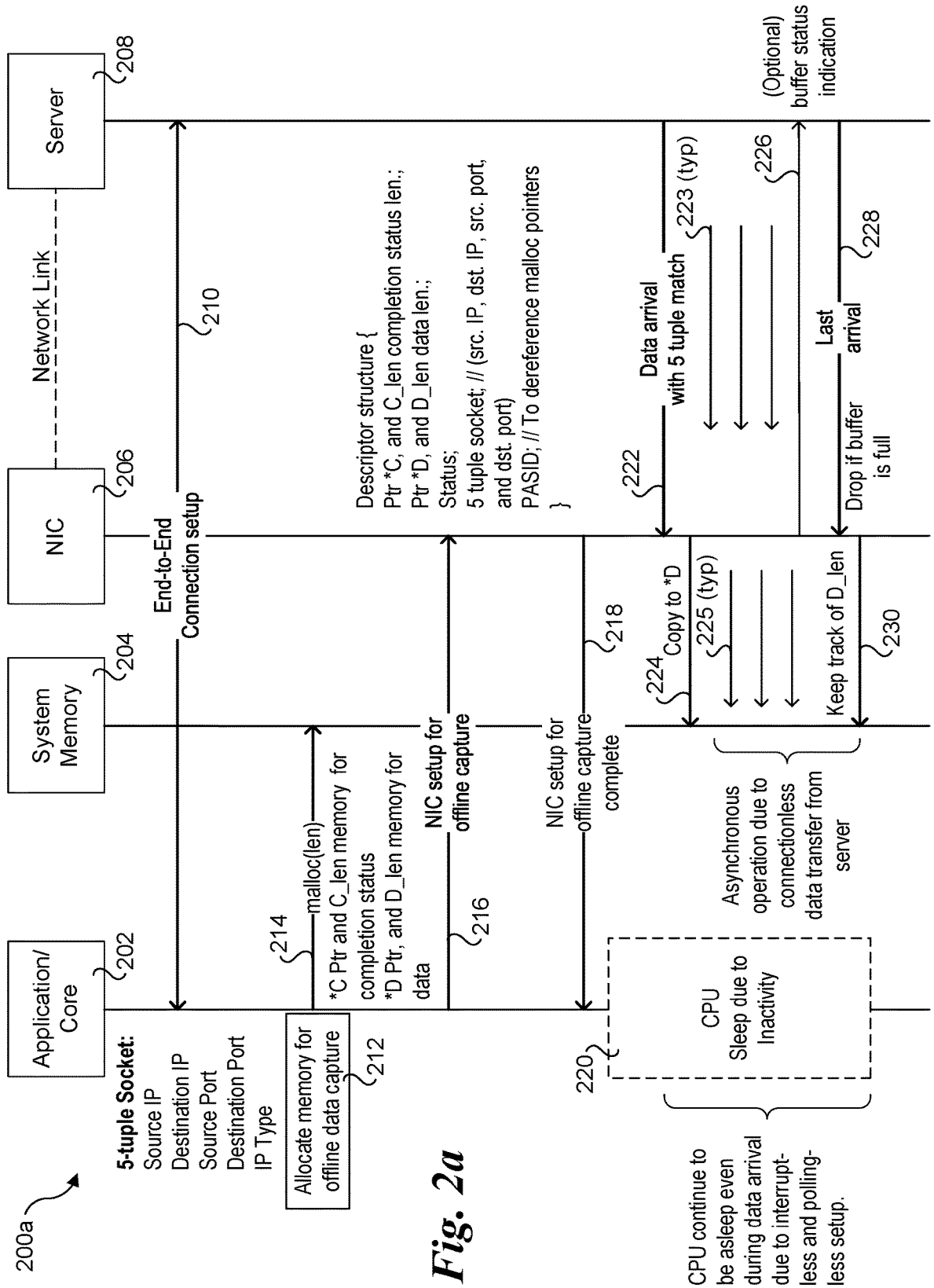
FIGS. 2a and 2b show respective portions of a signal flow diagram illustrating an offline processing setup based on application needs and usage example, according to one embodiment.
Figure 2B:
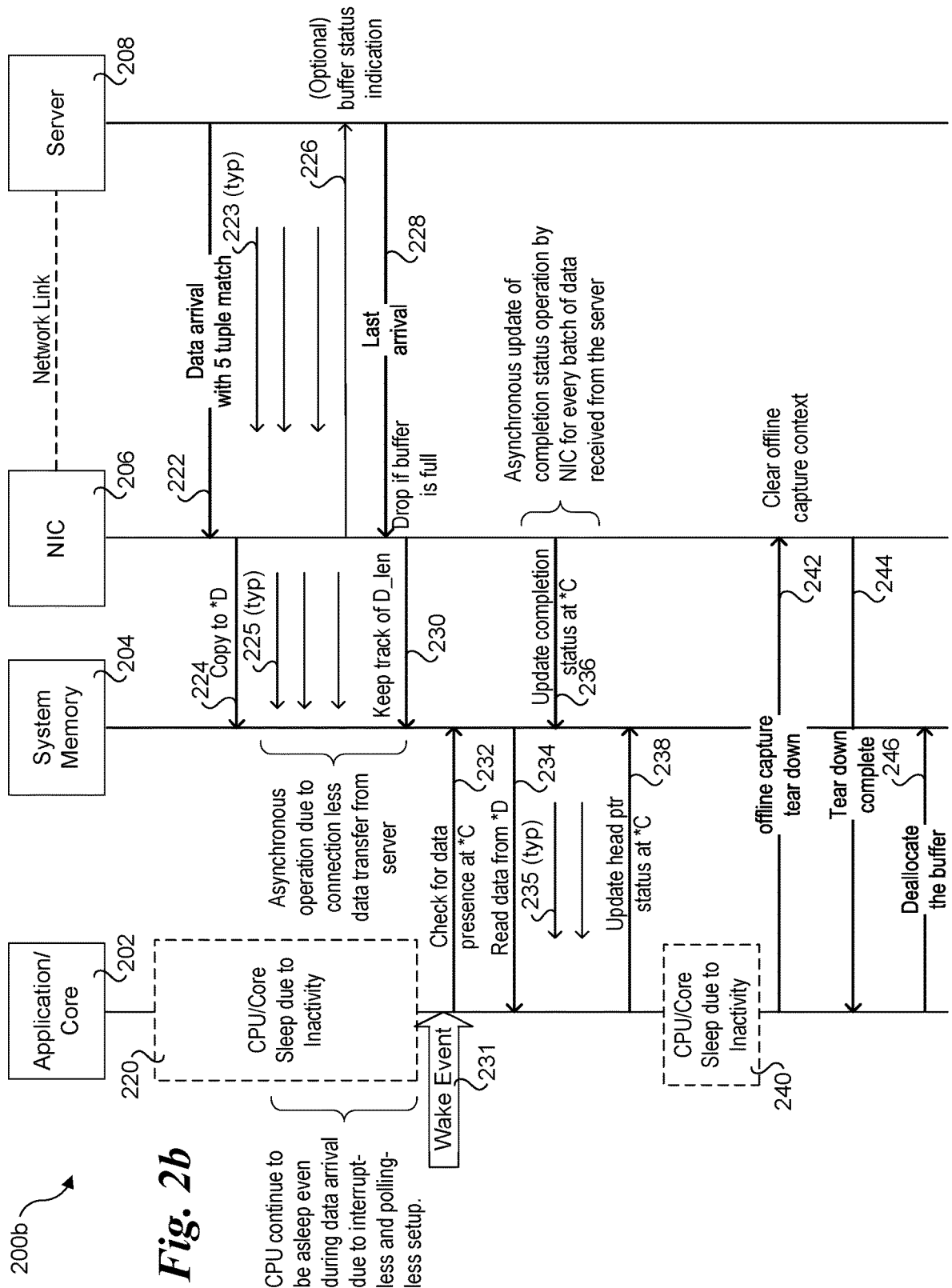

FIGS. 2a and 2b respectively show diagrams 200a and 200b which are respective portions of a signal flow diagram illustrating an offline processing setup based on application needs and usage example, according to one embodiment. At the top of each of diagrams 200a and 200b is an application/core 202, system memory 204, a NIC 206, and a server 208 that is connected to NIC 206 via a network link. The illustrated signal flows are used to set up an end-to-end connection between application/core 202 and server 208, as depicted by end-to-end connection setup 210. As discussed above, an application requests an end-to-end connection with the remote server for data transfer between the client (on the local platform/server) and the remote server. In the illustrated example, a 5-tuple socket is set up including a source IP (Internet Protocol) address, a destination IP address, a source port, a destination port, and an IP type. The 5-tuple socket is representative of various types of n-tuple sockets that are used to perform packet processing operations such as flow classification/identification, filtering, etc. In this example, the 5-tuple socket is set up to receive network traffic (e.g., one or more packet flows) associated with a traffic class In a block 212 memory is allocated for offline data capture for the application. The memory may be allocated executing a malloc(len) instruction (memory allocation instruction specifying a length, i.e., size of memory to be allocated) on the core an application thread is running on. As depicted by the exemplary data structure, this will include a pointer (Ptr) *C and C_len of memory for the completion status queue and a pointer *D and D_len memory for the data to be stored for the offline data capture. This is depicted by a malloc(len) signal 214 sent from application/core 202 to system memory 204.

Next, as depicted by a NIC setup for offline capture signal 216, NIC 206 is setup for offline capture. This includes setting up a descriptor structure of:

LISTING 1

```
1    Descriptor structure {
2      Ptr *C, and C_len completion status len;
3      Ptr *D, and D_len data len;
4      Status;
5      5 tuple socket; // (src. IP, dst. IP, src. port, and
6      dst. port)
7      PASID; // To dereference malloc pointers
8    }
```

As shown in line 2, the descriptor structure includes the pointer *C for the memory buffer that was allocated in block 212 and the length of the completion status C_len. Similarly, the descriptor includes pointer *D and the length of the data structure D_len. The descriptor further includes a Status (line 4), the 5-tuple socket (lines 5-6), and a PASID in line 7 used to dereference the malloc pointers *C and *D. Upon completion of the NIC setup for offline capture NIC 206 returns a signal 218 indicating NIC setup for offline capture has been completed.

As depicted by a block 220, at the stage the CPU (processor) is put into a low power "sleep" state due to inactivity. As further depicted, the CPU continues to stay in the sleep state during data arrival at NIC 206 due to the interrupt-less and polling less setup.

As shown by a signal 222, data is received from server 208 a NIC 206 with a 5-tuple match. During the 5-tuple socket setup, flow rules are set up in NIC memory to filter for latency-tolerant packet flows—that is data traffic that does not need to be immediately processed, thereby enabling the CPU to remain in its sleep state. For example, a filter may be setup for predetermined 5-tuple packet header values or ranges using hash functions and the like on the header field values defined for the 5-tuple matches. For signal 222, the received data corresponds to one of the filtered flows (that results in a 5-tuple match).

As shown by a signal 224 sent from NIC 206 to system memory 204, the received data is copied to the memory location in system memory for the buffer that was previously set up and pointed to by Ptr *D, which is an address for the buffer in system memory 204. As shown by data signals 223 and 225, as additional data for the matched flow is received at NIC 206, the data are written to the data buffer. As will be recognized by those skilled in the art, new data would be written at offsets into the data buffer based on the order in which the data arrive at the NIC and the amount (length) of data that has been previously written to the buffer. These data writes are implemented using Direct Memory Access (DMA) transactions, which do not involve processing on any cores. Also, the data would be written to the buffer following PHY and MAC Layer processing of the received data.

During this data receive and buffer processing, the NIC may send an optional signal 226 indicating the buffer status. For some types of traffic there may be coordination between a sender (e.g. server 208) and a receiver to ensure that receive buffers are not overfilled, which otherwise may result in dropped packets. As depicted by a last arrival signal 228 the last packet in the matched packet flow is received a NIC 206. As depicted by signal 230, the NIC keeps track of how much data has been written relative to D_len (the size of the buffer). As further shown, operations that are performed in connection with signals 222, 223, 224, 225, 226, 228, and 230 are asynchronous.

Continuing at the bottom of block 220 in diagram 200b, a wake event 231 causes the CPU (or an individual core on the processor) to wake from its sleep state. For example, the CPU or core can be awoken on an asynchronous (non-relevant) event. Upon being awoken, an applicable core will switch from a sleep state to an active state and (via execution of a thread on the core) consume data that was buffered by the NIC when it was asleep. Execution of the thread will also update the pointer and length to the NIC while updating the head of the buffer (write pointer) with NIC for offline packet processing.

The operations are illustrated on connection with signals 232, 234, 236, and 238. First, as depicted for signal 232, the core will check for the presence of data in the buffer located at Ptr *C in system memory 204. If data are present, the data are read from Ptr *D, as depicted by signal 234. As indicated by arrows 235, data continue to be read from the data buffer, with the head pointer status at Ptr *C being updated with signal 238.

Asynchronously, NIC 206 may update the completion status at Ptr *C, as depicted by signal 236. As this operation is asynchronous to the operations performed by the core, signal 236 may occur before or after signal 234. In one embodiment, the completion status may be updated by NIC 206 for every batch of data received from server 208.

As depicted in a block 240, the CPU or core reenter a sleep state due to inactivity. Subsequently, an offline capture teardown process is initiated by application/core 202 sending an offline capture teardown signal 242 to NIC 206. In response, NIC 206 clears its offline capture context and returns a tear down complete signal 244 to application/core 202. Application core 202 then deallocates the buffer, as depicted by a signal 246.

Flows are dynamically configured to be offline and online processing based on application requirements. The software logic that determines the switching is left to the application developers. Once the decision is made by the application, the proposed system handles the decision by activating and deactivating the offline capture of packets for a given 5-tuple or other packet flow filter criteria. As shown in FIG. 4(a), status field of descriptor notifies the NIC to active or deactivate the offline capture.

In today's SmartNIC products of Intel®, the NIC is able to track flows based on 5-tuple criteria for employing data-path flow rules. The hardware logic of the offline flow director enhances the SmartNIC capability to not only perform actions on the packets of a flow defined by a 5-tuple match, but also perform memory move operation to system memory with no CPU attention, as well as maintaining the protocol states for stateful connections.

Figure 3:
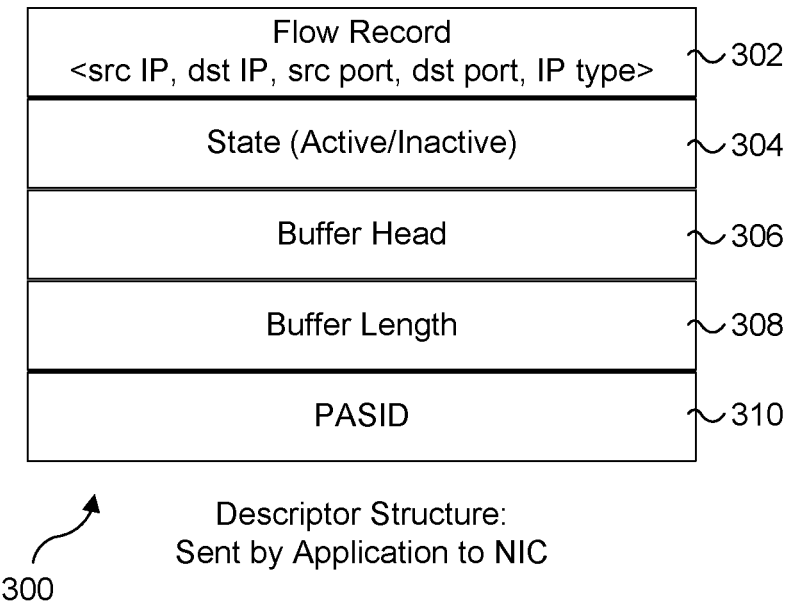
FIG. 3 is a block diagram of a descriptor structure, according to one embodiment.

FIG. 3 shows one embodiment of a descriptor structure 300 that is sent by an application to the NIC (such as the descriptor structure presented in LISTING 1 above corresponding to signal 216). Descriptor structure 300 includes a flow record 302, a state 304, a buffer head 306, a buffer length 308, and a PASID 310. The flow record is the 5-tuple packet header fields used for matching the flow. The buffer head corresponds to the head of the data buffer at which data are written (*D).

Figure 4:
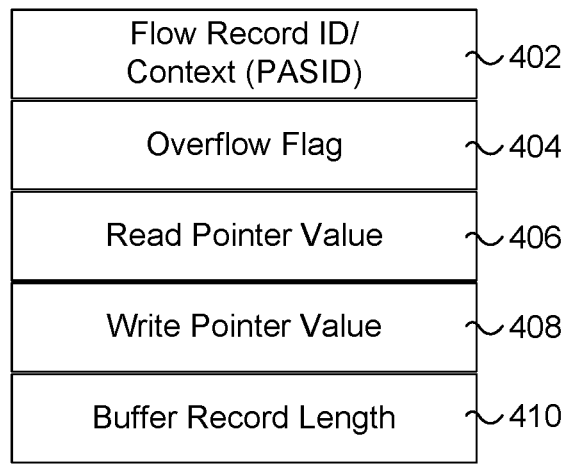
FIG. 4 is a block diagram of a completion status structure; according to one embodiment.

FIG. 4 shows an embodiment of a completion status structure 400 that is written by the NIC to system memory. Completion status structure 400 includes a flow record ID/context 402 comprising a PASID, an overflow flag 404, a read pointer value 406, a write pointer value 408, and a buffer record length 410.

End-to-End Offline-processing Flow Control

Based on application requirements, two modes of operation may be employed: 1) remote server agnostic; and 2) remote server aware. In the remote server agnostic operation, offline processing of packet data is unknown to the remote server, and there is no requirement for protocol changes and application layer state maintenance on the remote server, as the NIC hardware logic on the client side takes care of the protocol states that the remote server expects. From the perspective of the remote server, no changes have been made. This implementation has the advantage of simplicity.

In contrast to remote-server agnostic operation, remote-server aware operation has the knowledge of offline processing of the client at the remote server end, and therefore end-to-end flow control can be employed to effectively utilize the buffers for efficient transfer of data between the local client and the remove server. Although this approach is efficient, the applications on both ends of the connection are configured to maintain the states of offline-processing such that data is exchanged in an effective manner.

Figure 5A:
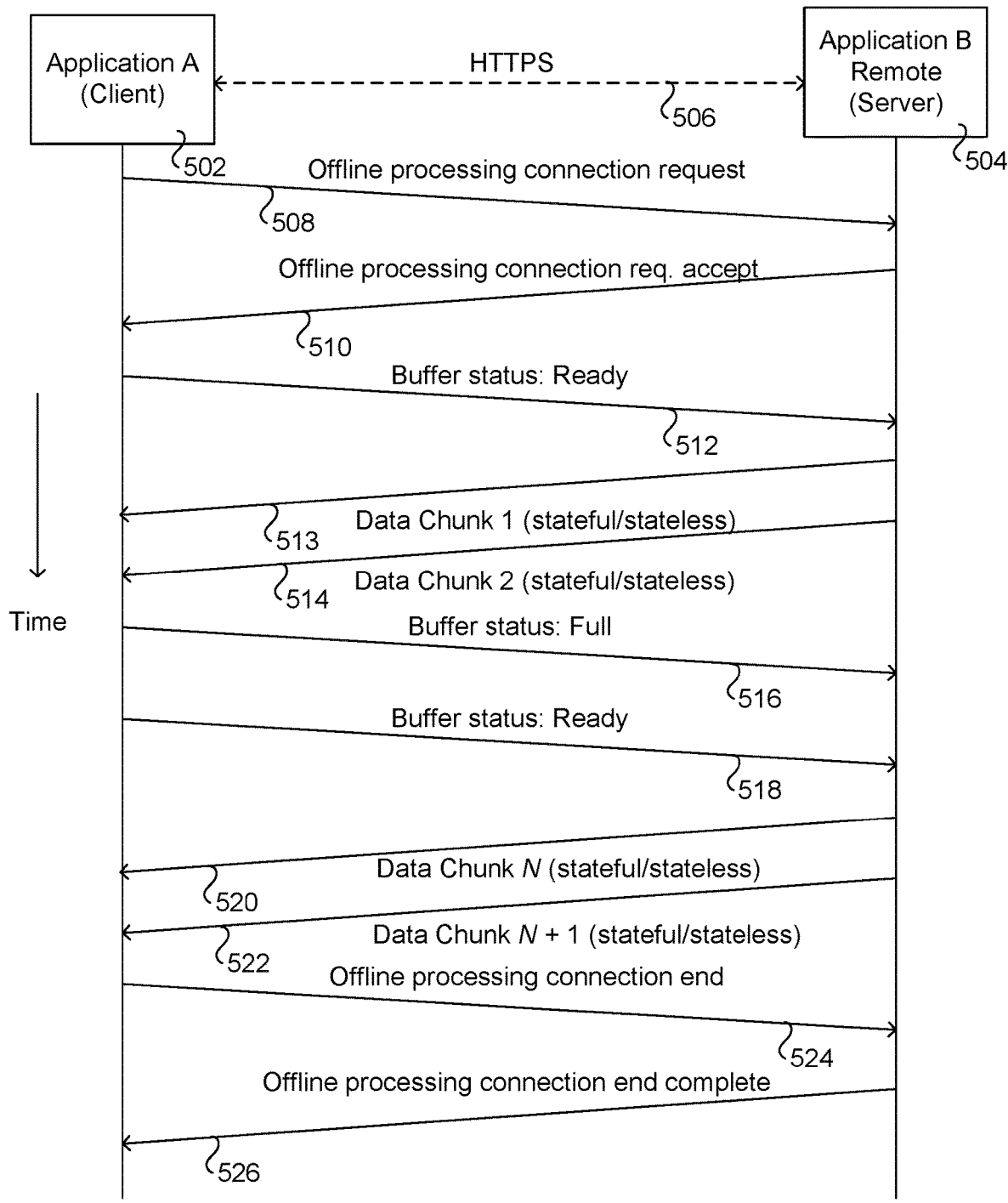
FIG. 5a is a message flow diagram illustrating an exchange of messages between application on a client and remote server to set up, perform, and tear down an offline packet processing session, according to one embodiment.

In one embodiment, the client and remote server exchange messages shown in message flow diagram 500a of FIG. 5a. The exchange of messages is between a first application 'A' running on a client 502, and a second application 'B' running on a remote server 504. In this example, the messages are sent over an HTTPS connection 506, although other types of connection may be used, as well.

Client 502 initiates the connection with remote server 504 with an offline processing connection request 508 at the application layer sends an offline processing connection request 508, followed by remote server 504 acknowledging the connection request by returning an offline processing connection request acceptance 510. This operation is for application 'B' to note that data transmissions should be at the best interests of client 502 to optimize data transfer based on offline-processing at the client end.

At this point, the client prepares to receive data from remote server 504. Once ready, client 502 then sends a Buffer status: Ready message 512 to server 504. As this point, server begins sending chunks of data, as depicted by data chunks 513 and 514 (Data Chunk 1 and Data Chunk 2). The chunks of data may be sent using a stateful connection or a stateless connection. In the illustrated example, it is presumed that the buffer becomes full. This is detected at client 502, which sends a Buffer status: Full message 516 to server 504. This informs application 'B' that it should pause sending new data chunks.

After at least a portion of the data in the buffer has been processed at client 502, the client sends a Buffer status: Ready message 518 to server 504. At this point, server 504 resumes sending data chunks, as depicted by a data chunks 520 and 522 associated with Data Chunk N and Data Chunk N+1.

After completion of the sending of data, the connection tear down process is performed. This includes client 502 sending an offline processing connection end message 524 to server 504, which returns an offline processing connection end complete message 526 to indicate the connection has been ended.

Figure 5B:
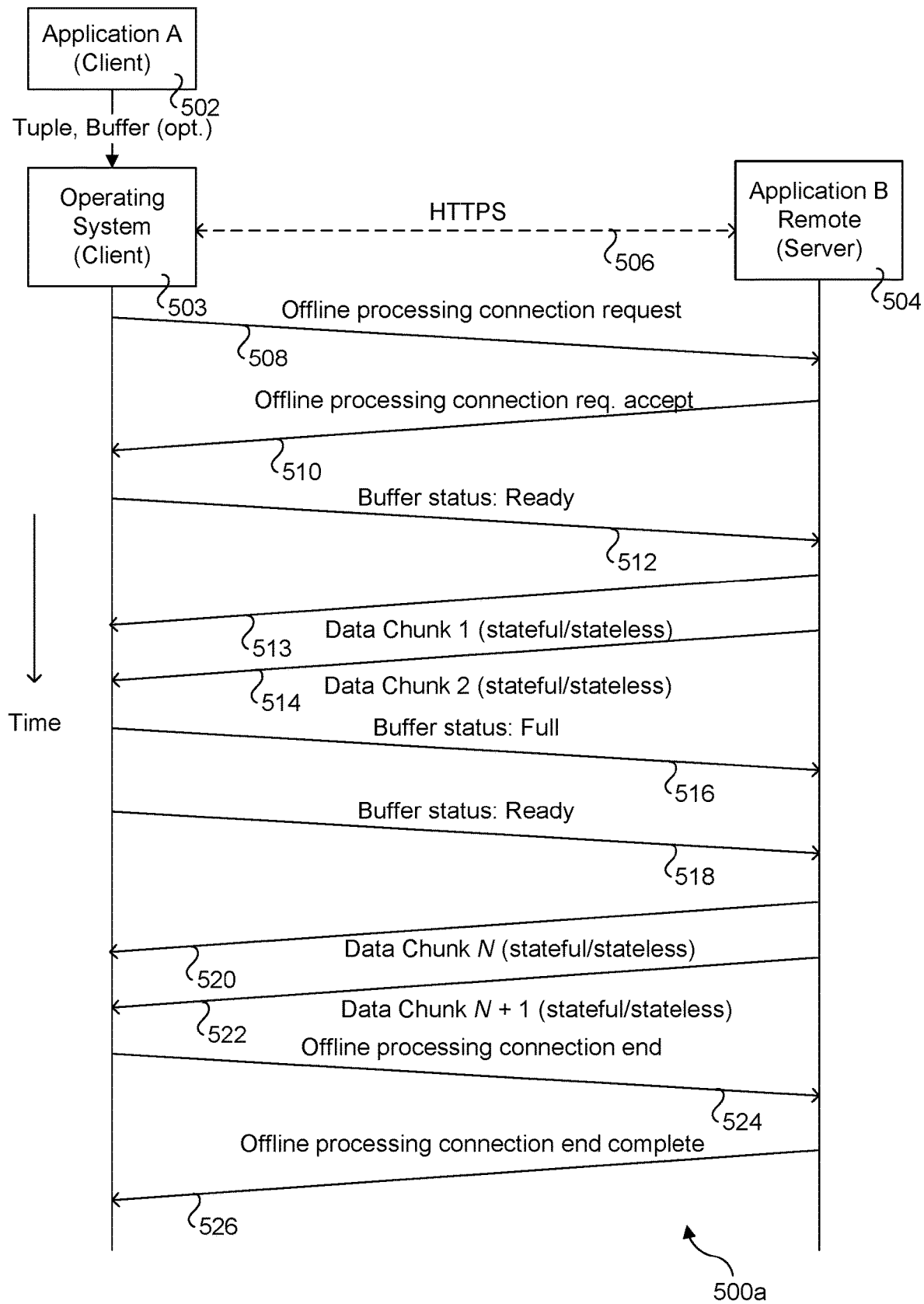
FIG. 5b is a message flow diagram illustrating an exchange of messages between operating system acting on behalf of an application on a client and remote server to set up, perform, and tear down an offline packet processing session, according to one embodiment.

Under an alternative implementation shown in a message flow diagram 500b in FIG. 5b, an operating system 503 on a client acts on behalf of an application 502 on the client and remote server to set up, perform, and tear down an offline packet processing session. As shown, application 502 submits a request to operating system 503 to set up and perform offline packet processing including a tuple (or other packet filtering criteria used to identify the traffic class to perform offline packet processing for and an option location of the buffer to use. Optionally, the operating system can determine the location of the buffer on its own and pass this buffer location back to application 502. The remaining operations and messages in message flow diagram 500b are the same as in message flow diagram 500b except that the messages are exchanged between operating system 503 on the client and server 504 rather than an application on client 502 and server 504.

Under another approach, an operating system acts on behalf of a client application to set up and tear down an offline packet processing session, while the application wakes up and performs packet-processing operations on the packets that have been buffered while the application is offline. Either the application or the operating system can be used to send the buffer status messages.

Applications may use short lived end-to-end connections to establish the offline processing connections. That is, the client and remote server could employ an HTTPS keep-alive connection for high-level message exchanges as shown in FIGS. 5a and 5b, while offline processing takes care of the bulk memory transactions for data. It is important to note, while the HTTPS connections are active in the application layers, the CPU and/or its cores can still go to sleep-states as HTTPS threads would be waiting on an event. Therefore, HTTPS is an auxiliary connection to support offline-processing connections.

TCP Extensions and Additional Discussion

In the case of end-to-end TCP connections, the primary challenge is to preserve the congestion control and to maintain the TCP states. Offline processing of TCP requires hardware logic that implements the TCP stack on the NIC controller. TCP hardware offload methods have been widely adopted, and are well-known in the art. With TCP protocol stack implementation in NIC hardware, the connection states of TCP may be offloaded from the application to the NIC controller along with destination buffers through the descriptor structures described an illustrated above. Thus, the disclosed approach is applicable to both stateful and stateless connections.

Additional applications may involve usage models similar to Remote Direct Memory Access (RDMA), where the client memory region is exposed directly through stateful and stateless connections such that the NIC from the client is able to read from and write to memory on the remote server.

In another use case, end-to-end power control may be achieved by decoupling the NIC and application control in the data transfer between end-points. That is, applications opportunistically update their buffer at either end (i.e., at either the remote server or client) for bi-directional data transfer, and then the NIC takes care of buffer-to-buffer transfer without application/CPU attention, enabling the CPU/core to remain in sleep states on both ends.

FIG. 6 shows one embodiment of a platform architecture 600 corresponding to a computing platform suitable for implementing aspects of the embodiments described herein. Architecture 600 includes a hardware layer in the lower portion of the diagram including platform hardware 602, and a software layer that includes software components running in host memory 604.

Platform hardware 602 includes a processor 606 having a System on a Chip (SoC) architecture including a central processing unit (CPU) 608 with M processor cores 610, each coupled to a Level 1 and Level 2 (L1/L2) cache 612. Each of the processor cores and L1/L2 caches are connected to an interconnect 614 to which each of a memory interface 616 and a Last Level Cache (LLC) 618 is coupled, forming a coherent memory domain. Memory interface is used to access host memory 604 in which various software components are loaded and run via execution of associated software instructions on processor cores 610.

Processor 606 further includes an Input/Output (I/O) interconnect hierarchy, which includes one or more levels of interconnect circuitry and interfaces that are collectively depicted as I/O interconnect & interfaces 620 for simplicity. Various components and peripheral devices are coupled to processor 606 via respective interfaces (not all separately shown), including a NIC 621 via an I/O interface 623, a firmware storage device 622 in which firmware 624 is stored, and a disk drive or solid state disk (SSD) with controller 626 in which software components 628 are stored. Optionally, all or a portion of the software components used to implement the software aspects of embodiments herein may be loaded over a network (not shown) accessed, e.g., by network controller 621. In one embodiment, firmware 624 comprises a BIOS (Basic Input Output System) portion and additional firmware components configured in accordance with the Universal Extensible Firmware Interface (UEFI) architecture.

During platform initialization, various portions of firmware 624 (not separately shown) are loaded into host memory 604, along with various software components. In architecture 600 of FIG. 6 the software components include a Type-1 hypervisor 630, also known as a "bare-metal" hypervisor. Optionally, a Type-2 hypervisor may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (i.e., it runs on the "bare metal" of the platform, hence the name). Yet another option, a container-based virtualization environment may be implemented in which application are run in containers that are run over a virtualization layer, such as Docker®-type containers.

Under platform architecture 600, each of m virtual machines (VMs) VM 1 . . . VM m includes an operating system 632 and receive buffers 634, where the receive buffers are where most network traffic is DMA'ed by the NIC and is separate from the offline packet buffers. For illustrative purposes, the memory space for VM 1 is shown as including the buffers for offline packets, completion status's, and descriptors for applications $A_1$ and $A_2$, while the buffer for offline packets, completion status, and descriptor for application $A_3$ is shown in the memory space for VM m. In addition, instances of applications $A_1$ and $A_2$ would be running on operating system 632 of VM 1, while an instance of application $A_3$ would be running on operating system 632 of VM 1. In practice, many more applications and associated offline packet buffers, completion status's and descriptors may be implemented. Platform architecture employing containers, such as Docker-type containers, may be implemented in a similar manner. In addition, computing platforms that only run a single instance of an operating system may also be used.

In FIG. 6, NIC 621 is depicted as include circuitry and logic for implementing the hardware device functionality of FIGS. 1, 2a and 2b and described above for FIG. 1 includes a packet decode block 110, an offline flow director block 112, a NIC processor 114, and NIC memory 116 containing flow rules 118, a downstream packet queue 120, and an upstream packet queue 122. NIC 621 is further depicted as including a port 636 having a receive (RX) buffer 638 and a transmit (TX) buffer 640, an optional firmware storage device 642, a physical function 644, one or more virtual functions 646, TCP logic 648 and optional RDMA logic 650. Generally, firmware 652 may be stored on-board network controller 621, such as in a firmware storage device 642, or loaded from another firmware storage device on the platform external to network controller 621 during pre-boot, such as from firmware store 622.

In addition to the illustrated components and logic blocks, NIC 621 may include additional circuitry and logic for implement aspects of SmartNICs, such as circuitry and logic for off-loading packet processing operations including identifying packet flows, generating hardware descriptors, supporting Receive Side Scaling, and DMA'ing hardware descriptors and packet data to various hardware descriptor queues and receive buffers in host memory 604.

Generally, a NIC may include one or more ports similar to port 636. As packet data is received from a network (that would be linked with via a link coupled to port 636), PHY and MAC Layer operations are performed to extract packet data. On the receive side, the packet data is buffered in RX buffer 638, which may be implemented as a buffer or a queue, such as a circular FIFO (First-in, First-out) buffer. As shown in FIG. 6, a sequence of packets A, B, C, and D for a latency-tolerant packet flow has been received at port 636 and is queue in RX buffer 638.

TCP logic 648 enabled NIC 621 to perform TCP-related operations in hardware on the NIC itself rather than having TCP operations performed in software (e.g., in an OS network stack). Optional RDMA logic 650 may be implemented to support the aforementioned RDMA operations. The RDMA operation may include conventional RDMA operations employ RDMA verbs and RDMA semantics, as well as virtual RDMA (vRDMA) operations implemented using extension to RDMA verbs and RDMA semantics to support RDMA transfers in virtual environments.

Physical function 644 and virtual functions 646 enable NIC 621 to be operated as an SR-IOV (Single Root IO virtualization) endpoint. These hardware components/logic in combination with software-based components in hypervisor 630, the VMs, and/or operating systems 632 virtualize the NIC 621's physical resources to enable software applications to access those resources.

FIG. 6a shows a platform architecture 600a including an SoC 606a having an integrated NIC 421a configured in a similar manner to NIC 421 in platform architecture 400, with the following differences. Since NIC 421a is integrated in the SoC it includes an internal interface 425 coupled to interconnect 414 or another interconnect level in an interconnect hierarchy (not shown). RX buffer 638 and TX buffer 640 are integrated on SoC 606a and are connected via wiring to port 636a, which is a physical port having an external interface. In one embodiment, SoC 606a further includes I/O interconnect and interfaces and platform hardware includes firmware, a firmware store, disk/SSD and controller and software components similar to those shown in platform architecture 600.

The CPUs 608 in SoCs 606 and 606a may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

Figure 7:
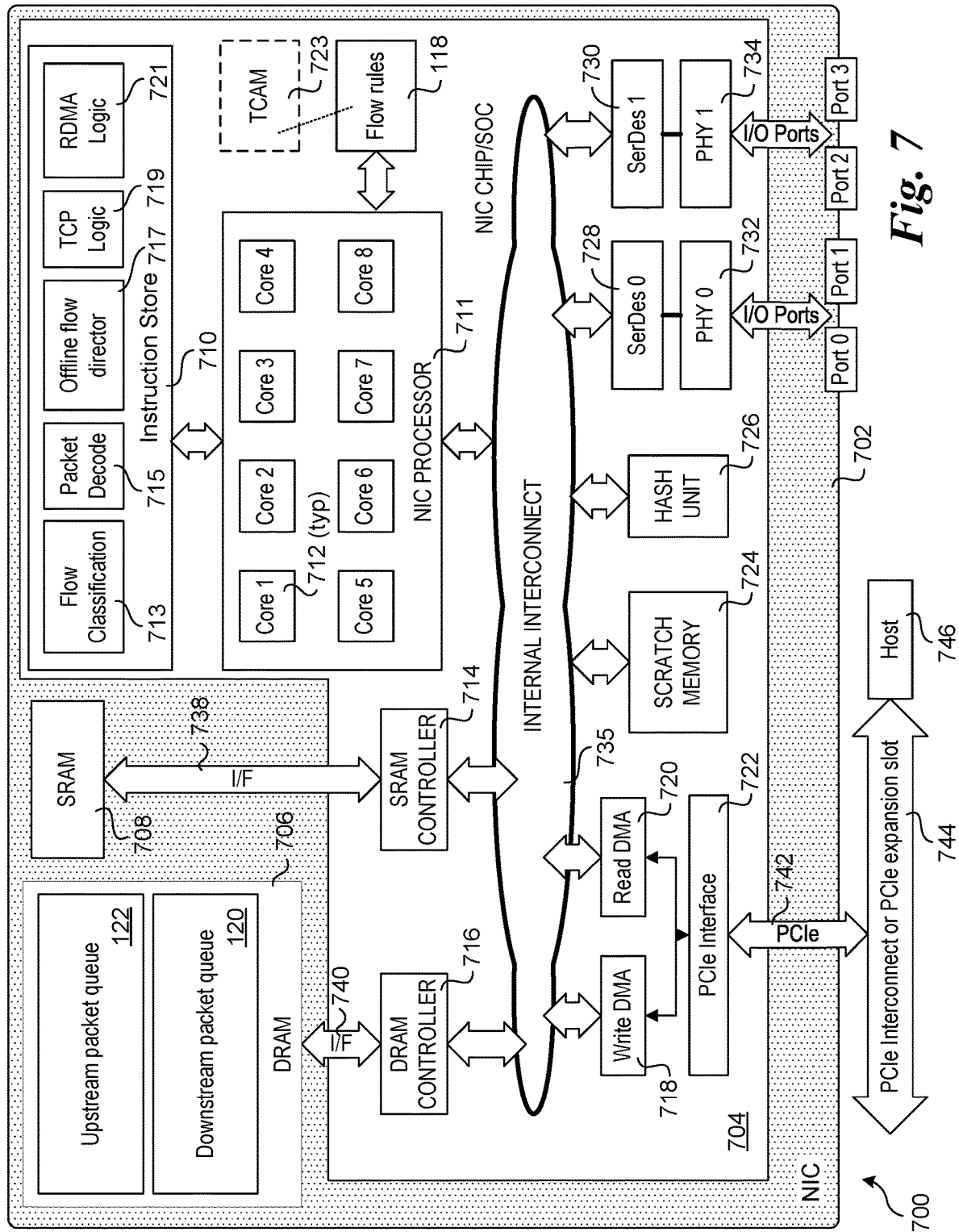
FIG. 7 is a schematic diagram illustrating an architecture for a NIC that may be used for implementing aspects of the hardware devices disclosed herein, according to one embodiment.

An exemplary system architecture for a NIC 700 is shown in FIG. 7. NIC 700 includes a NIC system board 702 on which a NIC Chip/SoC 704, Dynamic Random Access Memory (DRAM) 706 and Static Random Access Memory (SRAM) 708 are mounted. Under various embodiments, NIC system board 702 is representative of an Ethernet controller card, a daughter board, a multi-chip module board or substrate, or it may be part of a computer system board, such as a main board or motherboard for a computer server. NIC Chip/SoC 704 is representative of Ethernet processing and/or control unit, and may be embodied in various forms, including as an Ethernet controller chip or a network processor unit (NPU).

In the illustrated embodiment, NIC Chip/SoC 704 includes an instruction store 710, a NIC processor 711 including multiple cores 712, an SRAM controller 714, a DRAM controller 716, a Write DMA block 718, a Read DMA block 720, a PCIe interface 722, an optional TCAM (ternary content-addressable memory) 723, a scratch memory 724, a hash unit 726, Serializer/Deserializers (SerDes) 728 and 730, and PHY interfaces 732 and 734. Each of the components is interconnected to one or more other components via applicable interconnect structure and logic that is collectively depicted as an internal interconnect cloud 735.

Instruction store 710 includes various instructions that are executed by cores 712, including Flow Classification instructions 713, Packet Decode instructions 715, Offline flow director 717, TCP logic instructions 719, and RDMA logic instructions 721. Under one embodiment, various packet processing operations are performed using a pipelined architecture. As an alternative, the combination of cores 712 and instruction store 710 may be implemented using embedded programmable logic, such as via a Field Programmable Gate Arrays (FPGA) or the like.

In one embodiment, instruction store 710 is implemented as an on-chip store, such as depicted in FIG. 7. Optionally, a portion or all of the instructions depicted in instruction store 710 may be stored in SRAM 708 and accessed using SRAM controller 714 via an interface 738. SRAM 708 may also be used for storing selected data and/or instructions relating to packet processing operations.

Memory in DRAM 706 is used for downstream packet queue 120 and upstream packet queue 122 and is accessed using DRAM controller 716 via an interface 740. Write DMA block 718 and Read DMA block 720 are respectively configured to support DMA Write and Read operations in accordance with the embodiments described herein. In the illustrated embodiment, DMA communication between DRAM 706 and a platform host circuitry is facilitated over PCIe interface 722 via a PCIe link 742 coupled to a PCIe interconnect or PCIe expansion slot 744, enabling DMA Write and Read transfers between DRAM 706 and system or host memory for a host 746 using the PCIe protocol.

In addition to PCIe, other interconnect technologies and protocols may be used. For example, these include but are not limited to Computer Express Link (CXL), InfiniBand, and Omni-Path.

Scratch memory 724 and hash unit 726 are illustrative of components employed by NICs for facilitating scratch memory and hashing operations relating to packet processing. For example, as described above a hash operation may be implemented for deriving flow IDs and for packet identification. In addition, a hash unit may be configured to support crypo-accelerator operations.

PHYs 732 and 734 facilitate Physical layer operations for the NIC, and operate as a bridge between the digital domain employed by the NIC logic and components and the analog domain employed for transmitting data via electrical, optical or wired signals. For example, in the illustrated embodiment of FIG. 7, each of PHYs 732 and 734 is coupled to a pair of I/O ports configured to send electrical signals over a wire or optical cable such as a high-speed Ethernet cable. Optical and wireless signal embodiments would employ additional circuitry and interfaces for facilitating connection via optical and wireless signals (not shown). In conjunction with PHY operations, SerDes 728 and 730 are used to serialize output packet streams and deserialize inbound packet streams.

Generally, a NIC may be configured to store routing data for facilitating packet identification and flow classification, including forwarding filters and rules either locally or using a memory-mapped IO (MMIO) address space in system or host memory. When stored locally, this routing data may be stored in either DRAM 706 or SRAM 708. Routing data stored in a MMIO address space may be accessed by NIC 700 via Read and Write DMA operations. Generally, setting up MMIO address space mapping may be facilitated by a NIC device driver in coordination with the operating system. The NIC device driver may also be configured to enable instructions in instruction store 710 to be updated via the operating system. Optionally, the instructions in instruction store may comprise firmware instructions that are stored in non-volatile memory, such as Flash memory, which may either be integrated on NIC Chip/SoC 704 or mounted to NIC system board 702 (not shown).

As an option to using DRAM 706 or SRAM 708, flow rules 118 may be implemented in hardware-based logic such as a FPGA or other programmable logic device coupled to NIC processor 711. Hash unit 726 may be implemented in the same hardware-based logic as that used for flow rules 118. Flow rules 118 may also be implemented using TCAM 723.

NIC processor 711 may employ any suitable processor architecture in current use or developed in the future. In one embodiment, the processor architecture is an Intel® x86 architecture, an IA-32 architecture or an IA-64 architecture. In one embodiment, the NIC processor architecture is an ARM®-based architecture.

Generally, the functionality provided by embodiments of NICs disclosed herein may be implemented via one or more forms of embedded logic. As used herein, including the claims, embedded logic comprises various forms of circuitry with or configured to implement logic including but not limited to processors, CPUs, microengines, microcontrollers, FPGAs and other programmable logic devices, ASICs (Application Specific integrated Circuits), Graphic Processing Units (GPUs), and various forms of accelerators, etc. The logic may be implemented by programming the physical hardware (e.g., for FPGAs and other programmable logic devices and ASICs) and/or via execution of instructions on one or more processing elements, such as a processor core, microengine, microcontroller, and processing elements in GPUs and accelerators. Hybrid devices may be implemented with more than one form of embedded logic, such as a NIC that includes a processing pipeline that is implemented via a combination of pre-programmed or dynamically programmed hardware circuitry and one or more processing elements on which firmware or embedded software are executed.

The teaching and principles disclosed herein may be extended to other packet processing implementations. For example, they may be used with Application Device Queues (ADQ). ADQ is an application specific queuing and steering technology. It filters application traffic to a dedicated set of queues. The application threads of execution are connected to specific queues within an ADQ queue set. Accordingly, under one embodiment of an ADQ implementation ADQ queues may be allocated to predetermination traffic classes for which offline packet-processing is implemented. Meanwhile, other ADQ queues may be implemented in parallel for other traffic classes.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'n', 'M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed by a client including a processor having a plurality of cores coupled to system memory and a Network Interface Controller (NIC), comprising:
setting up a first connection between a first application on the client and a second application on a remote server, the first application executing on a first core;
allocating, in the system memory, a first offline packet buffer for offline packets associated with the first application;
while at least one of the processor and the first core is in a sleep state,
operating the client in an interrupt-less and polling-less mode as applied to a predetermined traffic class;
at the NIC,
receiving network traffic comprising a one or more packets from the remote server;
determining if the network traffic is associated with the predetermined traffic class;
when the network traffic is associated with the predetermined traffic class, writing packet data extracted from the network traffic to the first offline packet buffer.

2. The method of claim 1, wherein the predetermined traffic class is a delay-tolerant traffic class.

3. The method of claim 1, further comprising:
waking the at least one of the processor and the first core from the sleep state;
detecting that packet data is present in the first offline packet buffer; and
accessing, via the first application, the packet data from the first offline packet buffer.

4. The method of claim 1, further comprising:
allocating memory for the first offline packet buffer at a memory address in system memory and having a size;
generating a descriptor that includes data including the memory address and the size; and
providing the descriptor to the NIC.

5. The method of claim 4, further comprising:
defining packet header filter criteria used to detect packets belonging to the predetermined traffic class; and
including the packet header filter criteria in the descriptor; and
at the NIC,
extracting packet header data; and
employing the packet header filter criteria to detect packets belonging to the predetermined traffic class.

6. The method of claim 1, further comprising:
receiving traffic class information from the remote server to be used for identifying packets belonging to the predetermined traffic class; and
employing the information class information or data derived therefrom at the NIC to detect packets corresponding to the predetermined traffic class.

7. The method of claim 1, further comprising:
coordinating, between the client and the remote server, transfer of data belonging to the predetermined traffic class,
wherein buffer state information is exchanged between the client and the remote server to effect coordination of the transfer of data.

8. The method of claim 1, further comprising:
at the NIC,
receiving chunks of data belonging to the predetermined traffic class from the remote server;
writing the chunks of data to the first offline packet buffer;
detecting the first offline packet buffer is full; and
at least one of sending indicia to the remote server that the first offline packet buffer is full and dropping data in received chunks of data when the first offline packet buffer is full.

9. The method of claim 1, further comprising:
setting up an n-tuple socket on the client, the n-tuple socket configured to filter for packets belonging to a predetermined traffic class based on matches with n header fields in packets received at the NIC.

10. The method of claim 1, further comprising:
setting up a second connection between a third application on the client and the second application or a fourth application on the remote server, the second application executing on a second core;
allocating, in the system memory, a second offline packet buffer associated with the third application;
while at least one of the processor and the second core is in a sleep state,
operating the client in an interrupt-less and polling-less mode as applied to the predetermined traffic class;
at the NIC,
receiving network traffic comprising a one or more packets from the remote server;
determining if the network traffic is associated with the predetermined traffic class;
when the network traffic is associated with the predetermined traffic class, determining whether the packet data should be written to the first offline packet buffer or the second offline packet buffer and writing packet data extracted from the network traffic to that offline packet buffer.

11. A Network Interface Controller (NIC), configured to be implemented in a system including a host processor having a plurality of cores coupled to host memory, comprising:
at least one network port, including a first port; and
embedded logic configured to:
while at least one of the processor and a first core is in a sleep state,
receive network traffic comprising a one or more packets from a remote server at the first port;
determine if the network traffic is associated with the predetermined traffic class; and
when the network traffic is associated with the predetermined traffic class, write packet data extracted from the network traffic to an offline packet buffer that has been allocated in the host memory.

12. The NIC of claim 11, wherein the embedded logic is further configured to:
receive a descriptor from or programmed by software executing on the host processor identifying a memory address of the offline packet buffer and a size of the offline packet buffer; and
employ the memory address and size to write the packet data to the offline packet buffer.

13. The NIC of claim 12, wherein the descriptor further comprises packet filter criteria to be used to determine whether a packet belongs to the predetermined traffic class, and wherein the embedded logic is further configured to employ the packet filter criteria with packet header information extracted from packets received at the first port to determine whether the packets belongs to a packet flow associated with the predetermined traffic class.

14. The NIC of claim 11 wherein the descriptor further comprises information identifying a location of a completion status data structure in the host memory, and wherein the embedded logic is further configured to write information in the completion status data structure to indicate data transfer operations relating to data received from the remote server has been completed.

15. The NIC of claim 11, wherein the embedded logic is further configured to:
receive packets belonging to a packet flow associated the predetermined traffic class;
write data extracted from the packets to the offline packet buffer while monitoring a fill level of the offline packet buffer;
detect that the offline packet buffer is filled or has a fill level crossing a threshold, and in response thereto, send a message to the remote server informing the remote server to pause sending packets.

16. A system, comprising:
a host processor, having a plurality of cores;
host memory, coupled to the host processor;
software, loaded into the host memory, including at least one instance of an operating system and a first application having instructions to be executed on a first core of the plurality of cores, wherein execution of the software allocates an offline packet buffer in the host memory;
a Network Interface Controller (NIC), coupled to the host processor, including,
at least one network port, including a first port; and
embedded logic configured to,
while at least one of the host processor and the first core is in a sleep state,
receive network traffic comprising a one or more packets from a remote server at the first port;
determine if the network traffic is associated with the predetermined traffic class; and
when the network traffic is associated with the predetermined traffic class, write packet data extracted from the network traffic to the offline packet buffer.

17. The system of claim 16, wherein the embedded logic on the NIC is further configured to:
receive a descriptor from or programmed by software executing on the host processor identifying a memory address of the offline packet buffer and a size of the offline packet buffer; and
employ the memory address and size to write the packet data to the offline packet buffer.

18. The system of claim 17, wherein the descriptor further comprises packet filter criteria to be used to determine whether a packet belongs to the predetermined traffic class, and wherein the embedded logic on the NIC is further configured to employ the packet filter criteria with packet header information extracted from packets received at the first port to determine whether the packets belongs to a packet flow associated with the predetermined traffic class.

19. The system of claim 18, wherein the descriptor further comprises information identifying a location of a completion status data structure in the host memory, and wherein the embedded logic on the NIC is further configured to write information in the completion status data structure to indicate data transfer operations relating to data received from the remote server has been completed.

20. The system of claim 16, wherein execution of the software enables the system to set up a connection between the first application and a second application on the remote server, and wherein the embedded logic on the NIC is further configured to:
- receive packets belonging to a packet flow associated with the connection;
- write data extracted from the packets to the offline packet buffer while monitoring a fill level of the offline packet buffer; and
- detect the offline packet buffer is filled or has a fill level crossing a threshold, and in response thereto, send a message to the remote server informing the remote server or second application to pause sending packets.

* * * * *